United States Patent
Hong et al.

(10) Patent No.: US 8,544,743 B2
(45) Date of Patent: Oct. 1, 2013

(54) CARD READER HAVING IMPROVED ELECTROSTATIC DISCHARGE FUNCTIONALITY

(75) Inventors: Daniel Hong, Taipei (TW); Spencer Ting, Singapore (SG); Nang Hui Chan, Singapore (SG); Eng Joo Yap, Singapore (SG); Amihay Avital, Bat Hefer (IL); Ehud Kirmayer, Mevaseret Zion (IL)

(73) Assignee: Verifone, Inc., San Jose, CA (US)

( * ) Notice: Subject to any disclaimer, the term of this patent is extended or adjusted under 35 U.S.C. 154(b) by 295 days.

(21) Appl. No.: 12/857,991

(22) Filed: Aug. 17, 2010

(65) Prior Publication Data

US 2012/0043382 A1    Feb. 23, 2012

(51) Int. Cl.
G06K 7/06    (2006.01)
G06K 19/06    (2006.01)
G06K 7/00    (2006.01)

(52) U.S. Cl.
USPC ............ 235/441; 235/492; 235/493; 235/486

(58) Field of Classification Search
USPC ................. 235/492, 380, 441, 493, 486, 448; 439/630, 260, 325; 361/737, 752
See application file for complete search history.

(56) References Cited

U.S. PATENT DOCUMENTS

| | | | | |
|---|---|---|---|---|
| 3,831,119 | A * | 8/1974 | Ambrosio | 235/441 |
| 3,917,925 | A * | 11/1975 | del Rio | 235/448 |
| 5,380,997 | A | 1/1995 | Hania et al. | |
| 5,892,216 | A | 4/1999 | Grant et al. | |
| 5,929,414 | A * | 7/1999 | Saitoh | 235/492 |
| 6,015,311 | A * | 1/2000 | Benjamin et al. | 235/441 |
| 6,179,638 | B1 * | 1/2001 | Lim | 439/260 |
| 6,235,553 | B1 | 5/2001 | Kawan | |
| 6,308,889 | B1 * | 10/2001 | Grant et al. | 235/492 |
| 6,318,632 | B1 | 11/2001 | Grant et al. | |
| 6,325,653 | B1 * | 12/2001 | Takahashi | 439/260 |
| 6,341,727 | B1 * | 1/2002 | Canard et al. | 235/486 |
| 6,370,028 | B1 | 4/2002 | Seeley et al. | |
| 6,370,029 | B1 | 4/2002 | Kawan | |
| 6,431,898 | B1 * | 8/2002 | Asakawa | 439/325 |
| 6,435,887 | B2 | 8/2002 | Koitsalu | |
| 6,579,126 | B2 * | 6/2003 | Narumo et al. | 439/630 |
| 6,796,842 | B1 * | 9/2004 | Wang | 439/630 |
| 6,821,137 | B2 * | 11/2004 | Koser | 439/260 |
| 6,951,473 | B2 * | 10/2005 | Takahashi et al. | 235/475 |
| 7,009,846 | B1 * | 3/2006 | Wang et al. | 235/492 |
| 7,052,325 | B2 * | 5/2006 | Lin et al. | 235/441 |
| 7,677,462 | B2 | 3/2010 | Hynes et al. | |
| 2007/0170254 | A1 * | 7/2007 | Ishihara et al. | 235/441 |

* cited by examiner

Primary Examiner — Thein T Mai
(74) Attorney, Agent, or Firm — Sughrue Mion, PLLC

(57) ABSTRACT

A smart card reader including a smart card reading assembly including a plurality of smart card chip communication contacts and a static electricity discharge element assembled with the smart card reading assembly, the static electricity discharge element including a plurality of static electricity discharge contacts contacting multiple diverse surfaces of a smart card for discharge of static electricity thereon.

17 Claims, 5 Drawing Sheets

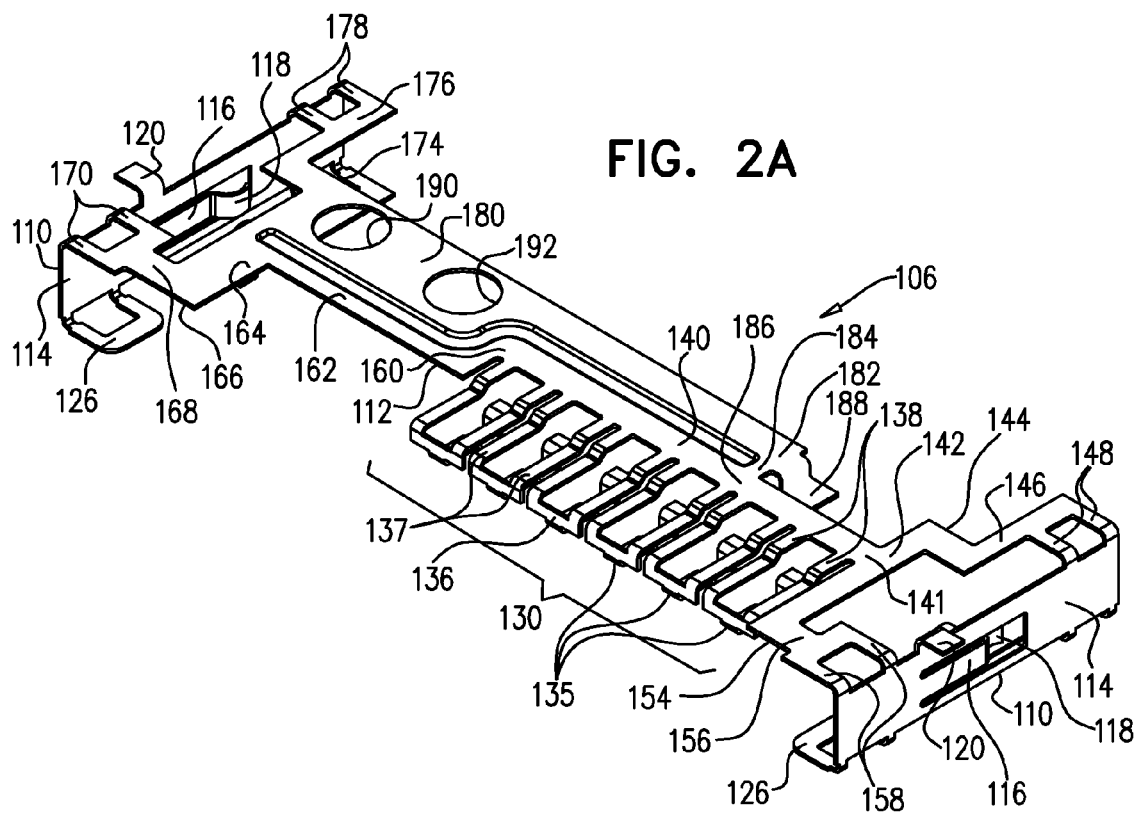
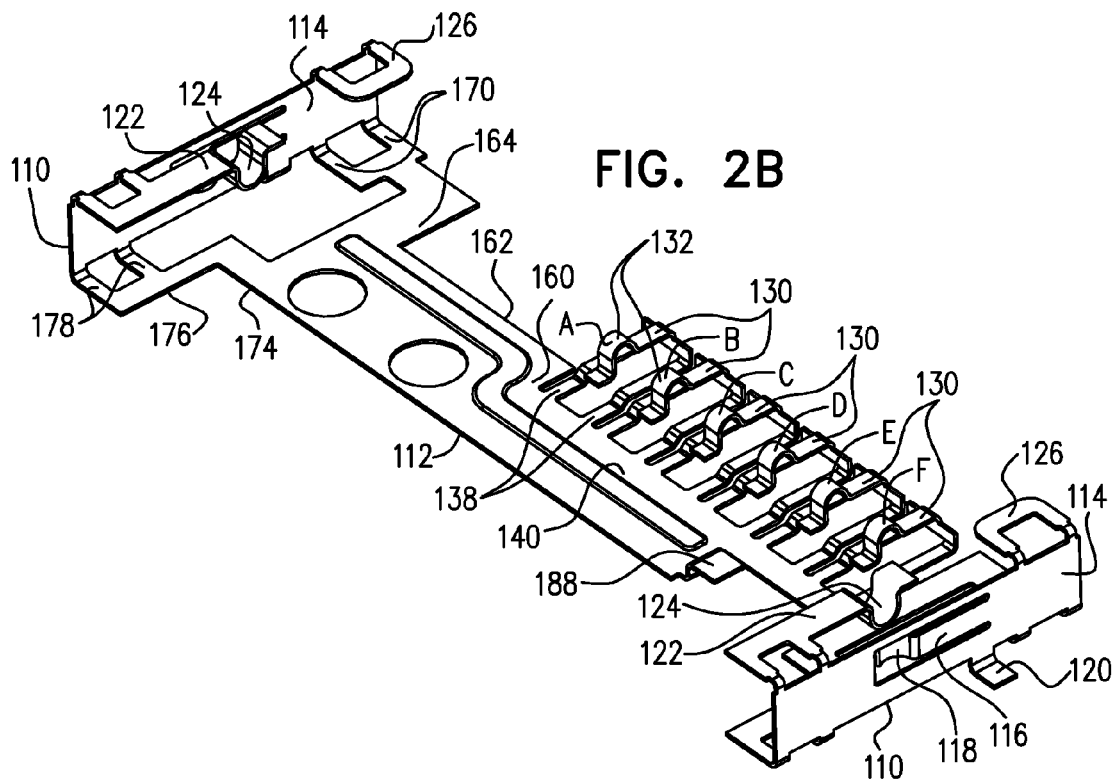

CARD READER HAVING IMPROVED ELECTROSTATIC DISCHARGE FUNCTIONALITY

FIELD OF THE INVENTION

The present invention relates to smart card readers generally.

BACKGROUND OF THE INVENTION

The following patent publications are believed to represent the current state of the art:

U.S. Pat. Nos. 7,677,462; 6,318,632; 6,370,028; 6,308,889; 6,235,553 and 5,892,216.

SUMMARY OF THE INVENTION

The present invention seeks to provide an improved smart card reader. For the purposes of the present application, the term "smart card" includes not only smart cards which have contacts but also contactless smart cards and hybrid cards, which have both contact and contactless smart card functionality.

There is thus provided in accordance with a preferred embodiment of the present invention a smart card reader including a smart card reading assembly including a plurality of smart card chip communication contacts and a static electricity discharge element assembled with the smart card reading assembly, the static electricity discharge element including a plurality of static electricity discharge contacts contacting multiple diverse surfaces of a smart card for discharge of static electricity thereon.

Preferably, the plurality of static electricity discharge contacts are arranged to contact the multiple diverse surfaces of a smart card prior to and during communication with a smart card chip mounted on the smart card. Additionally, the multiple diverse surfaces include top and bottom planar surfaces and edge surfaces of the smart card.

In accordance with a preferred embodiment of the present invention at least some of the plurality of static electricity discharge contacts are arranged to contact smart card chip contacts of a smart card chip mounted on the smart card prior to communication with a smart card chip mounted on the smart card.

Preferably, the static electricity discharge element includes a unitary element made of metal. Additionally, the unitary element includes first and second generally identical side portions and a central portion.

In accordance with a preferred embodiment of the present invention each of the first and second generally identical side portions includes a side wall having integrally formed therein an inwardly facing spring contact. Additionally or alternatively, each of the first and second generally identical side portions includes a side wall having a tab extending outwardly from a top edge thereof. Alternatively or additionally, each of the first and second generally identical side portions includes a side wall having an upwardly facing spring contact extending from a bottom edge thereof.

Preferably, the central portion supports a plurality of downwardly facing spring contacts, some of which are arranged to contact corresponding electrical contacts of a smart card chip and all of which are arranged to contact a top surface of the smart card.

In accordance with a preferred embodiment of the present invention the smart card chip communication contacts and the static electricity discharge contacts are arranged such that upon insertion of a smart card into the smart card reading assembly, the static electricity discharge contacts contact the smart card and smart card chip contacts for discharge of static electricity therefrom, prior to contact between the smart card chip communication contacts and the smart card chip contacts. Additionally, the plurality of static electricity discharge contacts are arranged to contact the multiple diverse surfaces of the smart card prior to and during communication with a smart card chip mounted on the smart card. Preferably, the multiple diverse surfaces include top and bottom planar surfaces and edge surfaces of the smart card.

In accordance with a preferred embodiment of the present invention the static electricity discharge element includes at least one aperture in order to reduce unwanted electrical coupling during electrostatic discharge.

BRIEF DESCRIPTION OF THE DRAWINGS

The present invention will be understood and appreciated more fully from the following detailed description, taken in conjunction with the drawings in which:

FIGS. 2A & 2B are simplified top and bottom view pictorial illustrations of an static electricity discharge element forming part of the smart card reader of FIG. 1.

DETAILED DESCRIPTION OF PREFERRED EMBODIMENT

Figure 1A:
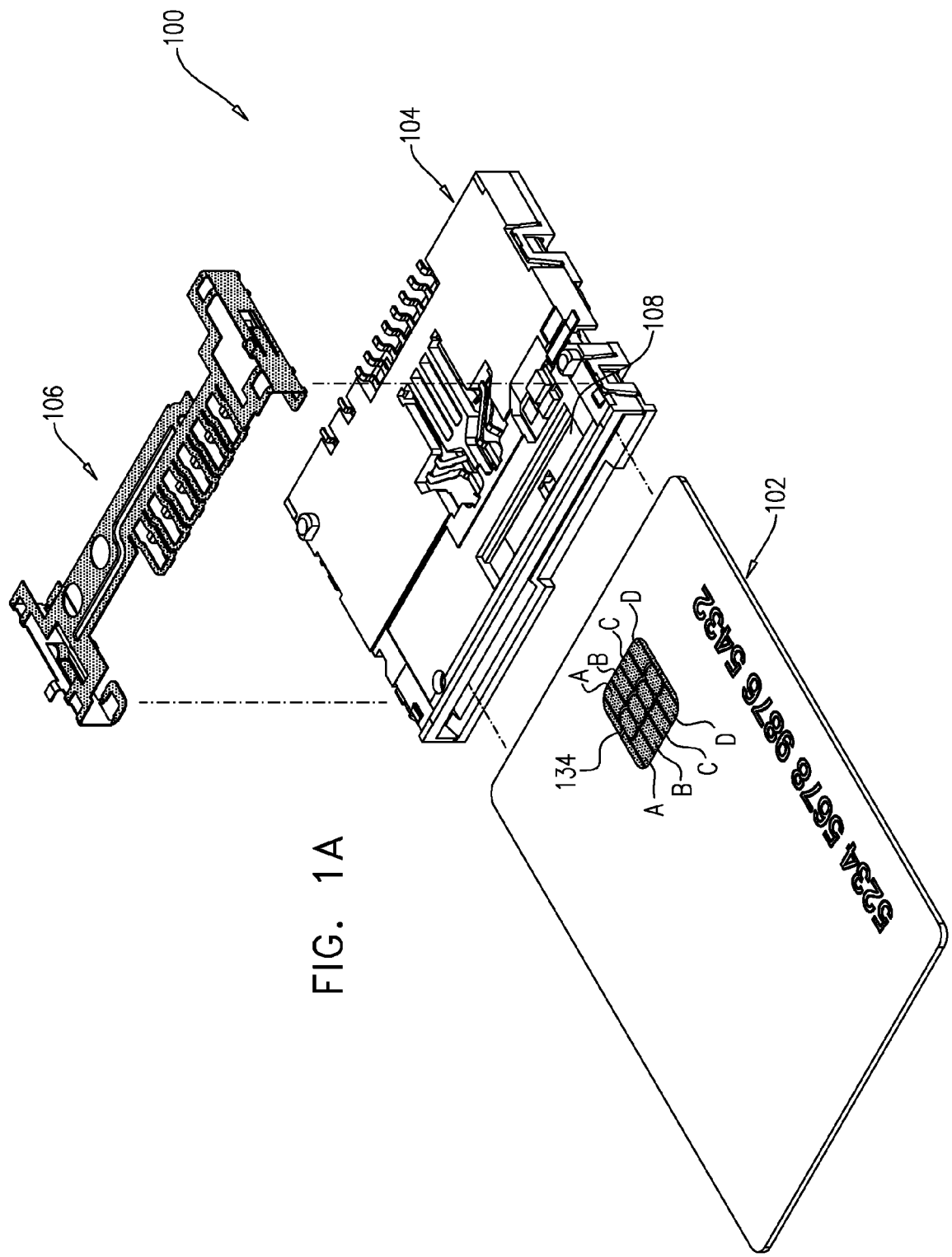
FIGS. 1A and 1B are simplified respective exploded view and assembled view illustrations of a smart card reader constructed and operative in accordance with a preferred embodiment of the present invention in association with a smart card.
Figure 1B:
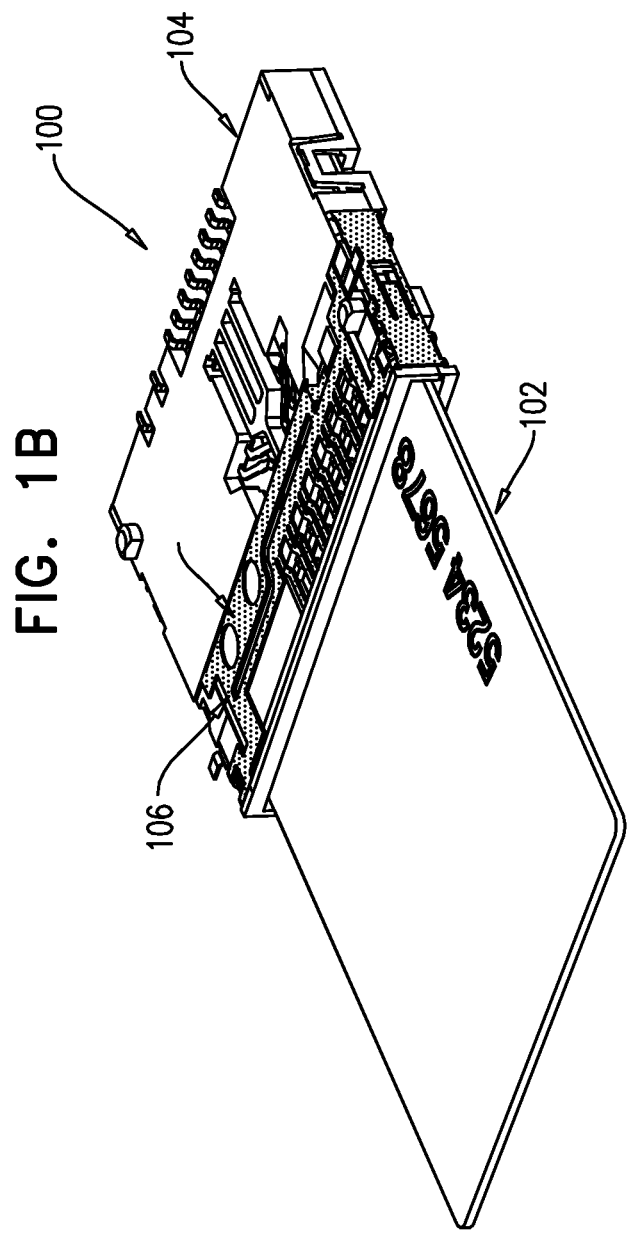

Reference is now made to FIGS. 1A & 1B, which are simplified respective exploded view and assembled view illustrations of a smart card reader 100 constructed and operative in accordance with a preferred embodiment of the present invention in association with a smart card 102, and to FIGS. 2A & 2B, which are simplified top and bottom view pictorial illustrations of part of the smart card reader of FIGS. 1A & 1B. Top and bottom designations are taken with reference to the orientation of the smart card reader 100 and the smart card 102 as shown in FIGS. 1A and 1B.

For the purposes of the present application, the term "smart card" includes not only smart cards which have contacts but also contactless smart cards and hybrid cards, which have both contact and contactless smart card functionality.

As seen in FIGS. 1-2B, the smart card reader 100 preferably comprises a smart card reading assembly 104 and a static electricity discharge element 106 which is assembled therewith. Smart card reading assembly 104 is preferably a conventional smart card reading assembly 104, such as a Model 840-19 or a Model 840-0F, commercially available from DDM Hopt+Schuler GmbH & Co. KG, of Rottweil, Germany, aside from the provision of a discharge contact access window 108, whose function is described hereinbelow, and outer surface configuration to accommodate static electricity discharge element 106.

Static electricity discharge element 106 is preferably a unitary element made of metal and includes first and second generally identical side portions 110 and a central portion 112. Each side portion 110 preferably includes a side wall 114 having integrally formed therein an inwardly facing spring contact 116 including an inwardly facing, curved contact surface 118. Extending outwardly from a top edge of each of side walls 114 is a tab 120.

Extending inwardly from a bottom edge of each side wall 114 is an upwardly facing spring contact 122 including an upwardly facing, curved contact surface 124. Also extending inwardly from the bottom edge of each side wall 114 is a mounting protrusion 126 which engages a suitable recess formed on each side of smart card reading assembly 104.

Central portion 112 supports a plurality of downwardly facing spring contacts 130, each including a downwardly facing, curved contact surface 132. Preferably six spring contacts 130 are provided. Typically four of the spring contacts 130, here designated by letters A, B, C and D, are arranged to contact corresponding electrical contacts A, B, C and D of a smart card chip 134 forming part of smart card 102. The remaining two spring contacts 130, here designated by letters E and F, are preferably arranged to contact a top surface of smart card 102.

Spring contacts 130 are each joined at an end 135 thereof onto an individual flexible support portion 136, which is, in turn, supported by a pair of flexible arms 137, whose ends 138 are each joined to an elongate support 140. On its right end 141, in the sense of FIG. 2A, elongate support 140 is joined to a transverse support 142. Transverse support 142 is joined at a first end 144 thereof to a bent arm support 146 which is joined to a top edge of a right side wall 114 by a pair of bent connecting arms 148. Transverse support 142 is joined at a second end 154 thereof to a support 156 which is joined to a top edge of right side wall 114 by a pair of bent connecting arms 158.

Elongate support 140 extends to the left by a curved portion 160 to a left elongate portion 162, which in turn joined to a transverse support 164. Transverse support 164 is joined at a first end 166 thereof to a support 168, which is joined to a top edge of a left side wall 114 by a pair of bent connecting arms 170. Transverse support 164 is joined at a second end 174 thereof to a support 176, which is joined to a top edge of left side wall 114 by a pair of bent connecting arms 178.

Elongate support 140 is additionally supported by a further elongate support 180 which extends to the right from transverse support 164 and is joined adjacent an end 182 thereof by a transverse portion 184 to an intermediate location 186 on elongate support 140. A bent tab 188 is provided at end 182 of elongate support 180 for grounding static electricity discharge element 106. Optionally, a flexible PCB having a capacitor and resistor in parallel may be connected between tab 188 and ground to control the discharge current. A pair of apertures 190 and 192 are preferably formed in elongate support 180 in order to reduce unwanted electrical coupling during electrostatic discharge.

Figure 3A:
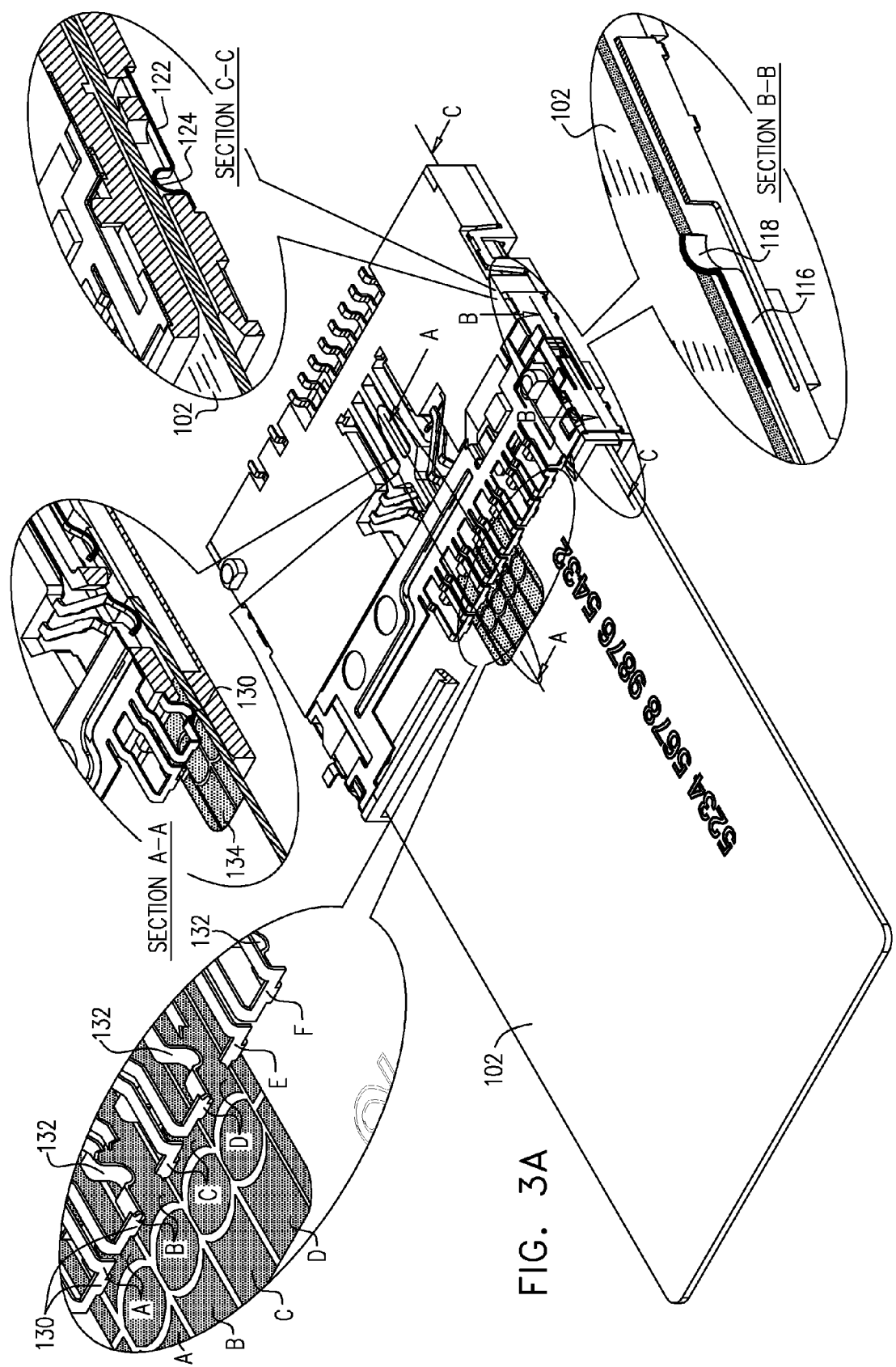
FIGS. 3A & 3B are simplified partially pictorial and partially sectional illustrations of the smart card reader of FIG. 1 in respective first and second operative orientations with a smart card partially and fully inserted therein, respectively, section A, being taken along lines A-A, section B, being taken along lines B-B and section C, being taken along lines C-C.
Figure 3B:
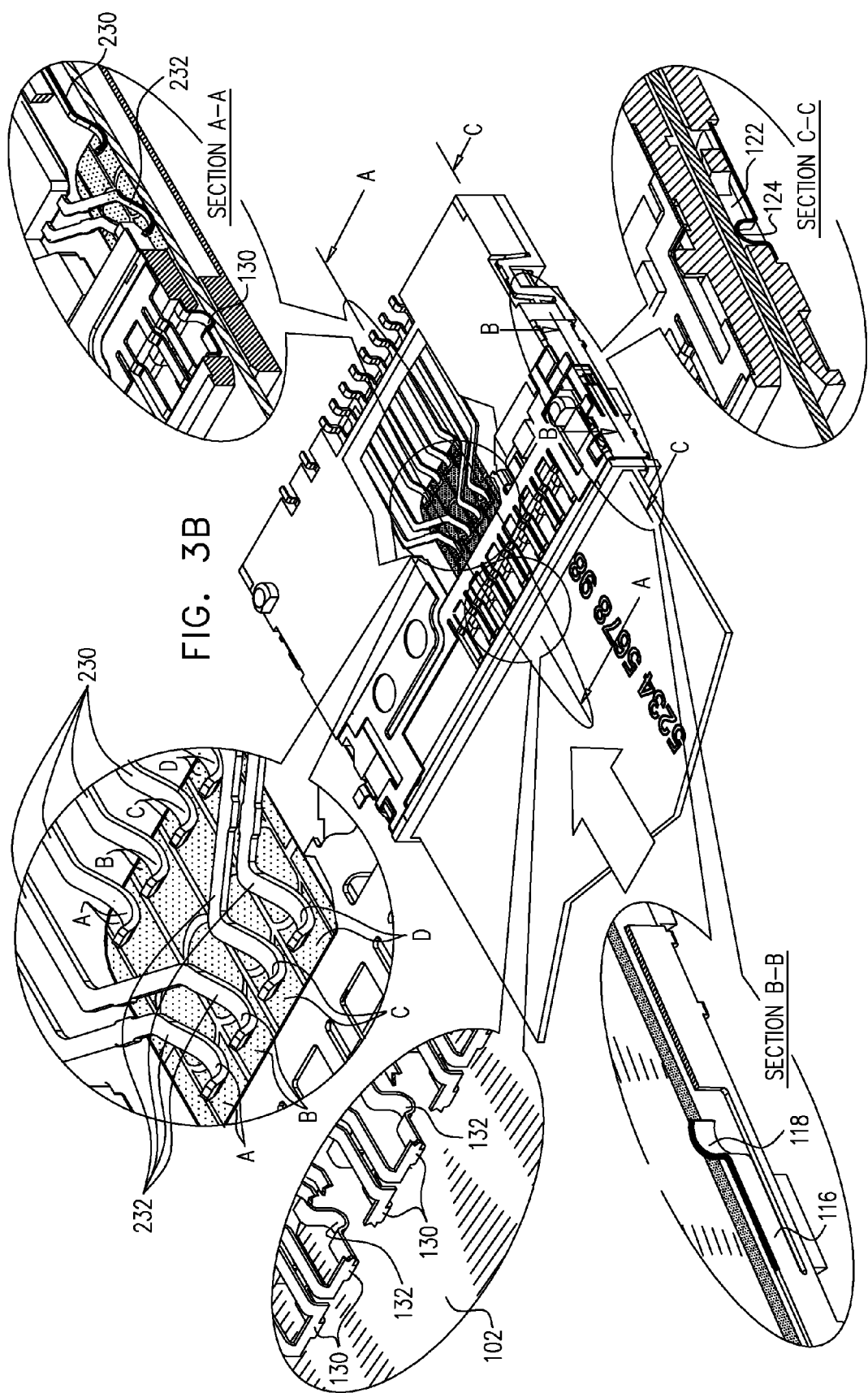

Reference is now made to FIGS. 3A & 3B, which are simplified partially pictorial and partially sectional illustrations of the smart card reader of FIG. 1 in respective first and second operative orientations with a smart card partially and fully inserted therein, respectively, section A, being taken along lines A-A, section B, being taken along lines B-B and section C, being taken along lines C-C.

Turning initially to FIG. 3A, which shows smart card 102 partially inserted into card reader 100, it is seen that contact surfaces 132 of four downwardly facing spring contacts 130, designated by letters A, B, C and D, contact corresponding pairs of electrical contacts designated by letters A, B, C and D of smart card chip 134 forming part of smart card 102 and contact surfaces 132 of two additional downwardly facing spring contacts 130, designated by letters E and F, contact a top surface of smart card 102. This contact is operative to discharge static electricity on electrical contacts A, B, C and D of smart card chip 134 and on the top surface of smart card 102, prior to reading of the smart card chip.

Additionally contact surface 118 of spring contacts 116 on both sides of the card reader 100 respectively engage side edges of the smart card 102 to discharge static electricity through the seam of the card and contact surface 124 of spring contacts 122 on both sides of the card reader 100 engage a bottom surface of smart card 102 to discharge static electricity through the bottom of the card.

Turning now to FIG. 3B, which shows smart card 102 fully inserted into card reader 100, it is seen that four downwardly facing spring contacts 230 of card reader assembly 104, designated by letters A, B, C and D, contact corresponding forward ones of pairs of electrical contacts, designated by letters A, B, C and D, of smart card chip 134 forming part of smart card 102 and four downwardly facing spring contacts 232 of card reader assembly 104, also designated by letters A, B, C and D, contact corresponding rearward ones of pairs of electrical contacts designated by letters A, B, C and D of smart card chip 134 forming part of smart card 102. The contact of spring contacts 230 and 232 with corresponding contacts of smart card chip 134 provides communication with the smart card chip 134.

It is appreciated that during communication of the card reader assembly 104 with the smart card chip 134, as seen in FIG. 3B, contact surfaces 132 of spring contacts 130, designated A-F, and contact surfaces 118 and 124, of spring contacts 116 and 122, respectively, continue to be in contact with the respective top, edge and bottom surfaces of the smart card 102.

It will be appreciated by persons skilled in the art that the present invention is not limited by what has been particularly shown and described hereinabove. Rather the scope of the present invention includes both combinations and subcombinations of various features described hereinabove as well as modifications and variations thereof which would occur to persons skilled in the art upon reading the foregoing and which are not in the prior art.

The invention claimed is:

1. A smart card reader comprising:
a smart card reading assembly including a plurality of smart card chip communication contacts; and
a metallic static electricity discharge element assembled with said smart card reading assembly, said metallic static electricity discharge element including a plurality of static electricity discharge contacts contacting at least top and bottom non-coplanar surfaces of a smart card for discharge of static electricity thereon,
said metallic static electricity discharge element being configured such that said plurality of static electricity discharge contacts are in contact with said at least top and bottom non-coplanar surfaces of said smart card prior to and during contact between said plurality of smart card chip communication contacts and a smart card chip, and wherein said metallic static electricity discharge element and said plurality of static electricity discharge contacts are disposed along an entrance edge portion of the smart card reading assembly and said plurality of smart card chip communication contacts do not extend along the entrance edge portion.

2. A smart card reader according to claim 1 and wherein said plurality of static electricity discharge contacts are also arranged to contact edge surfaces of said smart card prior to and during contact between said plurality of smart card chip communication contacts and said smart card chip.

3. A smart card reader according to claim 1 and wherein said static electricity discharge element comprises a unitary element.

4. A smart card reader according to claim 3 and wherein said unitary element includes first and second generally identical side portions and a central portion.

5. A smart card reader according to claim 4 and wherein each of said first and second generally identical side portions includes a side wall having integrally formed therein an inwardly facing spring contact.

6. A smart card reader according to claim 4 and wherein each of said first and second generally identical side portions includes a side wall having a tab extending outwardly from a top edge thereof.

7. A smart card reader according to claim 4 and wherein each of said first and second generally identical side portions includes a side wall having an upwardly facing spring contact extending from a bottom edge thereof.

8. A smart card reader according to claim 4 and wherein said central portion supports a plurality of downwardly facing spring contacts, some of which are arranged to contact corresponding electrical contacts of a smart card chip and all of which are arranged to contact a top surface of said smart card.

9. A smart card reader according to claim 1 and wherein said smart card chip communication contacts and said static electricity discharge contacts are arranged such that upon insertion of a smart card into said smart card reading assembly, said static electricity discharge contacts contact said smart card and smart card chip contacts for discharge of static electricity therefrom, prior to contact between said smart card chip communication contacts and said smart card chip contacts.

10. A smart card reader according to claim 9 and wherein said static electricity discharge element comprises a unitary element.

11. A smart card reader according to claim 10 and wherein said unitary element includes first and second generally identical side portions and a central portion.

12. A smart card reader according to claim 11 and wherein each of said first and second generally identical side portions includes a side wall having integrally formed therein an inwardly facing spring contact.

13. A smart card reader according to claim 11 and wherein each of said first and second generally identical side portions includes a side wall having a tab extending outwardly from a top edge thereof.

14. A smart card reader according to claim 11 and wherein each of said first and second generally identical side portions includes a side wall having an upwardly facing spring contact extending from a bottom edge thereof.

15. A smart card reader according to claim 11 and wherein said central portion supports a plurality of downwardly facing spring contacts, some of which are arranged to contact corresponding electrical contacts of a smart card chip and all of which are arranged to contact a top surface of said smart card.

16. A smart card reader according to claim 1 and wherein said static electricity discharge element includes at least one aperture in order to reduce unwanted electrical coupling during electrostatic discharge.

17. A smart card reader according to claim 1 and wherein:
at least one of said static electricity discharge contacts is not in contact with said smart card chip prior to contact between said plurality of smart card chip communication contacts and said smart card chip; and
said static electricity discharge contacts are not in contact with said smart card chip during contact between said plurality of smart card chip communication contacts and said smart card chip.

* * * * *